US011625786B2

(12) United States Patent
Baysal et al.

(10) Patent No.: US 11,625,786 B2
(45) Date of Patent: Apr. 11, 2023

(54) GUARANTEE FUND CALCULATION WITH ALLOCATION FOR SELF-REFERENCING RISK

(71) Applicant: Chicago Mercantile Exchange Inc., Chicago, IL (US)

(72) Inventors: Evren Baysal, Chicago, IL (US); Panagiotis Xythalis, Scotch Plains, NJ (US); Kailin Ding, Chicago, IL (US); Sixiang Li, Chicago, IL (US); Lu Lu, Pittsburgh, PA (US); Jun Zhai, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 17/503,884

(22) Filed: Oct. 18, 2021

(65) Prior Publication Data
US 2022/0036462 A1 Feb. 3, 2022

Related U.S. Application Data

(63) Continuation of application No. 16/679,787, filed on Nov. 11, 2019, now Pat. No. 11,182,857, which is a continuation of application No. 14/839,342, filed on Aug. 28, 2015, now Pat. No. 10,504,186.

(51) Int. Cl.
G06Q 40/00 (2012.01)
G06Q 40/06 (2012.01)
G06Q 40/08 (2012.01)

(52) U.S. Cl.
CPC ............. *G06Q 40/06* (2013.01); *G06Q 40/08* (2013.01)

(58) Field of Classification Search
CPC ..................................................... G06Q 40/06
See application file for complete search history.

(56) References Cited

U.S. PATENT DOCUMENTS

| 2013/0073479 | A1* | 3/2013 | Koblas | G06Q 99/00 |
| | | | | 705/36 R |
| 2013/0117197 | A1* | 5/2013 | Shah | G06Q 40/06 |
| | | | | 705/36 R |
| 2014/0032443 | A1 | 1/2014 | Ossanna | |
| 2015/0039530 | A1* | 2/2015 | Jha | G06Q 40/06 |
| | | | | 705/36 R |

OTHER PUBLICATIONS

On the corporate financial risk early warning and control 2010 International Conference on Future Information Technology and Management Engineering (vol. 2, pp. 267-269) Authors: Liu Jingzhong (Year: 2010).*

(Continued)

*Primary Examiner* — Bruce I Ebersman
*Assistant Examiner* — John A Anderson
(74) *Attorney, Agent, or Firm* — Lempia Summerfield Katz LLC

(57) ABSTRACT

Computer implemented systems and methods are disclosed that allow for the efficient and rapid determination of guarantee funds for clearing member firms. Disclosed systems and methods account for the exposure of self-referencing risk.

20 Claims, 6 Drawing Sheets

(56) References Cited

OTHER PUBLICATIONS

Pricing of guarantees for principal-protected funds under the constant proportion portfolio insurance strategy 2007 IEEE International Conference on Systems, Man and Cybernetics (pp. 1854-1859) Authors: Chonghui Jiang • Yongkai Ma • K.W. Li (Year: 2007).*

Clearing, Settlement and depository issues by Francis Braeckevelt Nov. 7, 2006 http:// www.bis.org (Publ/bppdf / bispap) (Year:2006).

Pricing of Guarantees for Principal-Protected Funds Under the Constant Proportion Portfolio Insurance Strategy byChonghui Jiang, Yongkai Ma, and Kevin W. Li, Senior Member, IEEE dated 2007 (Year: 2007).

* cited by examiner

|     | $CMF_1$ | $CMF_2$ | $CMF_3$ | $CMF_4$ | Total |
| --- | --- | --- | --- | --- | --- |
| Margin | $400 | $480 | $320 | $300 | |
| Stress | $1,600 | $1,080 | $420 | $400 | |
| $PRL^{base}$ | $1,200 | $600 | $100 | $100 | |
| $W_i^{base}$ | 60% | 30% | 5% | 5% | |
| $Stress^{SRR}$ | $2,500 | $1,530 | $1,320 | $400 | |
| $PRL^{SRR}$ | $2,100 | $1,050 | $1,000 | $100 | |
| $\Delta PRL^{SRR}$ | $900 | $450 | $900 | $- | |
| $W_i^{SRR}$ | 40% | 20% | 40% | -% | |
| $SRRGF_i$ | $720 | $360 | $720 | $- | $1,800 |
| $BGF_i$ | $1,080 | $540 | $90 | $90 | $1,800 |
| $GF_i$ | $1,800 | $900 | $810 | $90 | $3,600 |

Figure 2

GUARANTEE FUND CALCULATION WITH ALLOCATION FOR SELF-REFERENCING RISK

REFERENCE TO RELATED APPLICATIONS

This application claims priority to and is a continuation of U.S. patent application Ser. No. 16/679,787 filed Nov. 11, 2019, now U.S. Pat. No. 11,182,857, which claims priority to and is a continuation of U.S. patent application Ser. No. 14/839,342 filed Aug. 28, 2015, now U.S. Pat. No. 10,504,186, the entire disclosures of which are hereby incorporated by reference.

FIELD OF THE INVENTION

The present invention relates to methods and systems for clearing of credit default swaps.

DESCRIPTION OF THE RELATED ART

A credit default swap ("CDS") is a contract between two parties, the protection buyer and a protection seller, whereby the protection buyer is compensated for the loss generated by a credit event in a reference instrument. The credit event can be the default of the reference entity, lack of payment of a coupon or other corporate events defined in the contract. In return the protection buyer pays a premium, e.g. equal to an annual percentage X of the notional or face value/amount, to the protection seller. The premium X, quoted in basis points or percentage points of the notional, i.e. face amount, is called the CDS spread. CDS's are often analyzed by graphing the CDS spread vs. maturity which results in a curve. This spread is paid, for example, (semi)annually or quarterly in arrears until either maturity is reached or default occurs. In the case of default occurring prior to maturity, the protection seller pays the protection buyer the face value of the reference asset minus its post-default market value, through physical or cash settlement. Thus, the protection buyer is protected against losses in case the reference entity defaults. If the buyer owns the reference security, the CDS acts as a hedge against default: such 'insurance against default' was the initial motivation for introducing credit default swaps.

However, unlike insurance contracts, credit default swaps do not require exposure to the underlying credit risk: a CDS may be used to gain a synthetic exposure to the credit risk of a firm. Compared to the strategy of holding (or shorting) the corresponding bond, the CDS strategy leads to the same exposure but only requires a small amount of capital at inception, equal to the collateral or margin posted with the counterparty. Also, in instances where the underlying bond may be difficult to short, the CDS enables to take a speculative short position that benefits from a deterioration of the issuer's creditworthiness. The sheer volume of the CDS market indicates that a substantial portion of contracts are speculative; in principle, the outstanding notional of credit default swaps may even become larger than the total debt of the reference entity.

Many credit default swaps are over-the-counter ("OTC") derivatives and are not exchange-traded. CDS markets are generally dealer markets where a few major institutions control an overwhelming proportion of the volume and post quotes for protection premiums on various reference entities.

Central counterparties ("CCPs") have been proposed as a solution for mitigating counterparty risk and preventing default contagion in the CDS market. A clearinghouse (or central counterparty) acts as the buyer to every seller and seller to every buyer of protection, thereby isolating each clearing member firm from the default of other clearing member firms. Clearing member firms post collateral with the central counterparty and are subject to daily margin calls. This helps reduce losses in case of default and mitigates counterparty risk. Also, management of collateral and margin calls by the CCP can help reduce operational risk in the CDS market.

A clearinghouse is not an exchange: prices are still negotiated over the counter and there is no auction mechanism for price fixing. However, for the purpose of marking positions and computing margins, clearinghouse clearing member firms are required to post quotes for all instruments being cleared, which leads to some degree of price transparency.

Clearing member firms can create self-referencing risks when they have exposure to credit default swaps that reference themselves or their affiliates. There is a need in the art for improved systems and methods that allow clearinghouses to mitigating against self-referencing risks.

SUMMARY OF THE INVENTION

Embodiments of the present invention overcome problems and limitations of the prior art by providing systems and methods that may be used to efficiently determine guarantee fund values while accounting for self-referencing risk. A computer system may be programmed with computer-executable instructions to determine a guarantee fund. A base guarantee fund requirement is first determined for each clearing member firm by assuming no self-referencing risk and a predetermined number of jump to defaults of clearing member firms. Next, a self-referencing risk guarantee fund requirement is determined for each clearing member firm by considering self-referencing risks and assuming a predetermined number of jump to defaults by clearing member firms. Total guarantee fund requirement is then determined for each clearing member firm by summing the base guarantee fund and the self-referencing risk guarantee fund for each clearing member firm.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 2 shows a chart that may be used to calculate a base guarantee fund and a self-referencing risk guarantee fund in accordance with an embodiment of the invention.

DETAILED DESCRIPTION OF THE INVENTION

Figure 1:
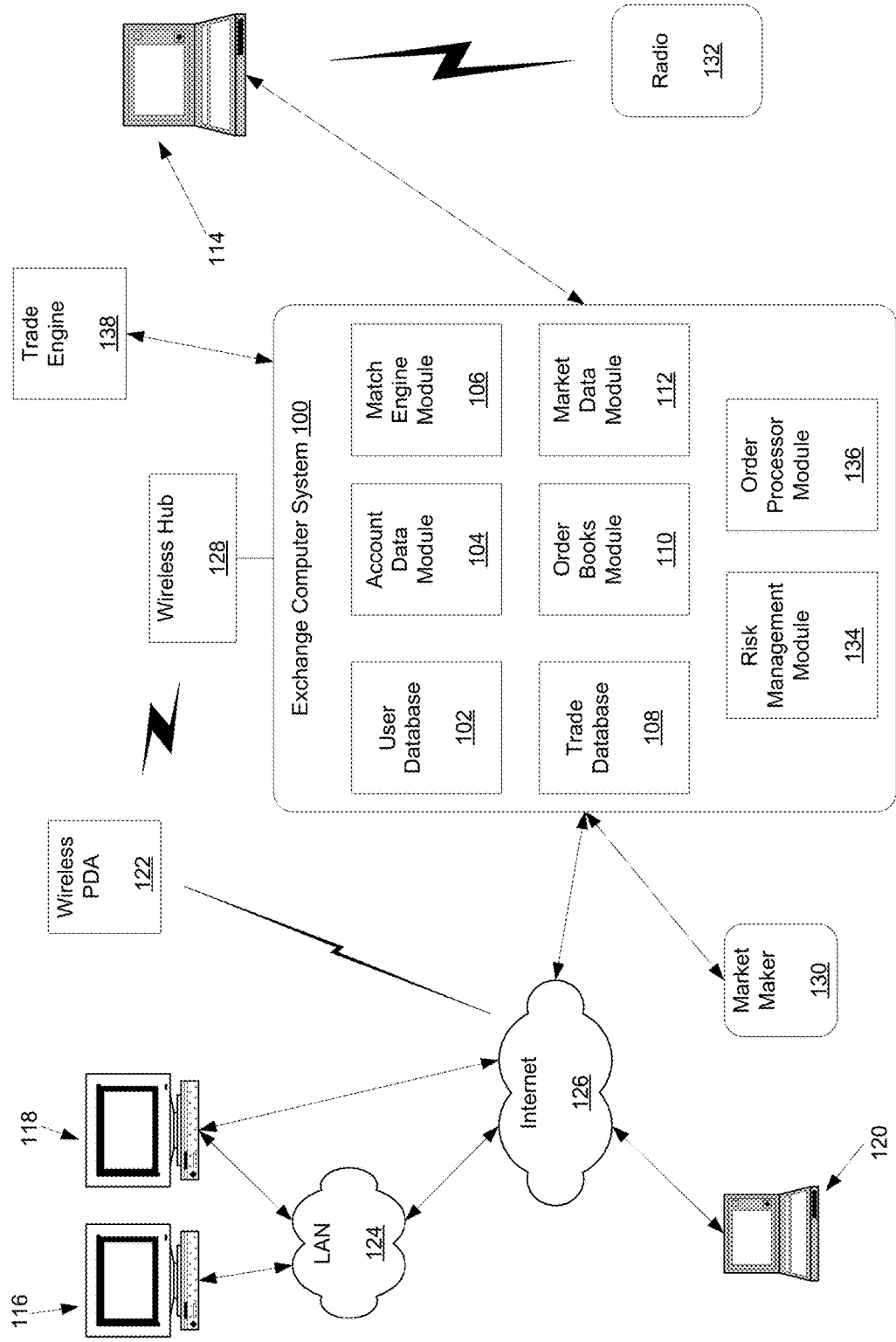
FIG. 1 shows a computer network system that may be used to implement aspects of the present invention.

Aspects of the present invention may be implemented with computer devices and computer networks that allow users to perform calculations and exchange information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Given their important role as a bulwark against counterparty risk and contagion, Clearing houses or central counterparties ("CCPs") use stringent risk management procedures to ensure their own stability, including in stress scenarios when a large dealer may default. Risk management of central counterparties is currently done at several levels:

Screening and monitoring of the credit risks of clearing members through membership requirements, notably based on minimum capital requirements on members.

Margin requirements are used to absorb short term losses and first losses in case of the default of a clearing member. The horizon over which losses are considered is related to the anticipated time frame necessary for unwinding a position in the market under consideration. For CDS markets this corresponds to a few days.

Margin levels are adjusted daily through margin calls.

Guarantee fund or clearing fund: large losses not covered by the margin are covered by a guarantee fund, to which clearing members contribute according to the risk of their position. By mutualizing extreme risks, the guarantee fund contributes to the overall stability of the clearinghouse and reduces systemic risk by immunizing each member from the default of others.

Margin requirements are typically designed to cover short term losses, which may arise from CDS spread volatility or from losses due to the default of the underlying reference entity of the CDS (referred to as "jump-to-default" or "JTD"). CDS spreads are observed to be highly volatile and exhibit large fluctuations and margin levels should account for this "heavy-tailed" nature of the risk. It is generally desirable for margin requirements to be very responsive to short term, e.g. over 5 days or less, market fluctuations.

Computing appropriate jump-to-default requirements for clearing members may be based on loss given default, not on expected loss as is often done in current OTC margin agreements. For a stand-alone 'naked' single name CDS, this would lead to a large collateral requirement, which would strongly discourage the protection seller. For a CDS portfolio, however, it may be feasible to require that the margin covers the loss given a fixed number of defaults in the portfolio over the risk horizon (usually a few days).

Whereas margin concerns the short term risk of each clearing member's portfolio, the guarantee fund may address systemic risk or "tail" risk faced by the CCP. Tail risk is the possibility of an investment's value moving more than three standard deviations from the mean being greater than what may be shown in a normal distribution and generally refers to portfolios with distributions of returns that do not follow a normal or expected pattern. Guarantee fund requirements are generally not viewed as an additional margin: the guarantee fund's main role may be to mutualize extreme losses in excess of margin. Such extreme losses typically occur in the event of the default of a clearing member and arise from the cost of liquidating its position. The level of the guarantee fund may be fixed in order to cover liquidation costs in extreme but plausible scenarios. Currently it is recommended to require a CCP to dispose of sufficient funds to cover losses due to default of any single clearing member, but regulators have considered, in practice, two or more dealer defaults in some cases.

Central counterparties may stress test their risk management system in order to assess the adequacy of the level of margin and guarantee fund requirements. The outcome of the stress test largely depends on the configuration of portfolios of clearing members: a market where most clearing members/dealers have are large net protection buyers or sellers represents a different risk than a market where most clearing members have well-balanced long-short portfolios. Therefore a meaningful stress test needs to consider different portfolio configurations for clearing members and identify (plausible) worst case scenarios from the viewpoint of the central counterparty's risk. For example, one could simulate plausible portfolio configurations for clearing members and consider, across the simulated scenarios, the cost of liquidating each dealer's portfolios in case of their default. This cost, net of collateral, which may include margin, determines the risk posed by the dealer to the CCP and its allocation to the guarantee fund should be determined accordingly.

A clearing house is a central counterparty to each of the clearing member firms and has exposure to the risk of their default. To address this counterparty credit risk, a clearing house may require clearing member firms to provide collateral for their obligations under cleared CDS transactions, and may have rules that mutualize the risk of a clearing member firm default across all clearing member firms. Each clearing member firm, therefore, may be required to both post margin and make contributions to a guarantee fund. Each clearing member firm may be required to make an initial, uniform contribution to the guarantee fund, as well as contributions made on an ongoing basis based on the clearing member firm's actual and anticipated CDS position exposures. A clearing house may also contribute to the guarantee fund. As a result, the guarantee fund may grow in proportion to the position risk associated with the aggregate volume of CDS cleared by the clearing house.

If a clearing member firm defaults, the clearing house may draw on the margin collateral the clearing member firm has posted. If that is insufficient, the clearing house may then look to the defaulting clearing member firm clearing member firm's guarantee fund contribution. The clearing house may use other guarantee fund contributions to satisfy any remaining obligations of the defaulting clearing member firm. If the total guarantee fund is inadequate to cover losses on the defaulted obligations, the clearing house may have the ability to assess an additional guarantee fund contribution from all non-defaulting clearing member firms, subject to certain limitations in the clearing house's rules.

As described above, guarantee funds, along with margin accounts, are part of the general CDS financial safeguards package. Guarantee funds act with margin accounts as an additional layer of protection to account for extreme market circumstances. The guarantee fund is contributed to by specific clearing members, and the fund is shared by all clearing members in a pool. The CDS guarantee fund accounts for extreme instances of risk that are not accounted for by the CDS margin model, e.g. systemic risks and/or risks to the CCP itself.

Some of the disclosed embodiments relate to a method for calculating a value, i.e. the size or magnitude, such as in dollars, of a CDS guarantee fund, such as more optimal size thereof, e.g. a size more reflective of the true risk, or each member's contribution thereto, thereby reducing or minimizing the burden on clearing member firms while adequately ensuring that risks are covered. Some of the disclosed embodiments utilize a generalized approach to avoid too many risk scenarios while still accounting for all relevant possible portfolio constructions.

Other methods of calculating the guarantee fund may rely on the CDS margin model which is used to calculate the margin necessary to cover short term losses and/or risks limited to an individual clearing member firm. In applying the CDS margin model to sizing the guarantee fund, extreme scenarios may be used to calculate maximum loss and/or the model analysis may be applied over a longer period of time, e.g. greater than 5 days. However, such use of the margin model may drastically overestimates the size of the guarantee fund due to double-counting certain risks, i.e. those risks having a significant amount of multi-collinearity, that is, a high degree of dependence or correlation, and, therefore, may result in being too punitive on the clearing member firm s. In other words, using a method which is based on non-unique sources of risk and does not factor out correlated risks may result in double and triple counting.

A stress model may be used for determining a size of a guarantee fund associated with a cleared credit portfolio. The stress model may be an extension of the margin model, where the stress spread risk requirement may be calculated from a higher percentile of the P&L distribution across scenarios (e.g., $VaR_q$, where q=99.75%). In the calculation, a number of entities may be considered for the jump-to-default. For example, two entities may be considered in the jump-to-default calculations. Similarly, the JTH spread may be computed from a lower (e.g., 0.05%) percentile of the high correlation scenarios. The spread risk requirement is the maximum of the base, basis and system stress VaR, where $\alpha_{stress}=1$. Further, the stress volatility forecast may be chosen to be the maximum of the (99.75% percentile of historical EWMA volatility) and (2.3 times the most recent EWMA volatility). In some cases, the interest rate risk requirement may be computed from the 0.25% and the 99.75% percentile of historical log changes of the 5-year point on the IR curve.

The stress model of the RMCC, as implemented using a clearinghouse computing system, may allow for a comprehensive set of scenarios. Parameter sets used with the stress model may be used to cover "extreme but plausible scenarios." For example, these scenarios may be used to address low probability, but high impact risk factors resulting from certain situations. By combining the margin model and the stress model in the RMCC, use of both the margin model and the stress model may be simple and intuitive and results may be easy to replicate by end users.

The risk model may be used to analyze and/or model statistical features of credit spread movements for one or both of single name CDS and CDS indices. For example, the RMCC may allow for time series analysis of different risk factors (e.g., spread log changes, etc.) associated with a particular CDS product and/or with a portfolio of CDS products. For single name CDS products, the risk factors may include par spreads at fixed benchmark tenors (e.g., 1 year, 3 year, 5 year, 7 year, 10 year, etc.). For CDS indices, the risk factors may include par spreads of synthetic on the run or off the run (OTR) indices (e.g., $OTR_{-k}$(k=0, 1, . . . ) at a fixed maturity) that may be interpolated at fixed benchmark tenors to preserve stationarity. For the RMCC, salient characteristics of risk factors may include autocorrelations that may be non-uniform across entities and tenors, heteroscedasticity, varying degrees of heavy tails that may be observed but have statistically weak asymmetry, stable average correlations (e.g., Single name—Single name, Single name—Index, Index—Index, and the like). In some cases, the characteristics may have strong correlations across tenors, strong dependence across on-the-run and off-the-run indices of the same index family, an index on a constituent basis, a breakdown of correlations in distressed markets and or jumps which may be defaults (jump-to-default) and/or drastic improvements (e.g., a jump to health) in credit quality.

In some cases, the RMCC may be modeled using a risk modeling computing system that may be associated with a financial institution and/or a clearinghouse. The risk modeling computing system may be configured to store models in a data repository and/or another non-transitory memory device as instructions and/or other information (e.g., parameters, CDS market information, CDS index information, CDS single name information, and/or the like. For example, the risk modeling computing system may include one or more computing devices configured to retrieve the instructions and/or other information from the data repository and/or non-transitory memory device via a network to generate a risk model for use as the RMCC by a risk model generator. In some cases, the risk model generator may design the RMCC using one or more different model types, such as a factor model or a scenario based model. Each model has associated advantages and disadvantages. For example, factor models may be simple and easy to calibrate, but may provide incoherent modeling of portfolio benefits. For example, the factor model may include rule based correlation offsets. However, these offsets may not be readily extendible to new risk factors which may be introduced to the model over time. Factor based models also may rely on a decomposition model for efficiency, for both basis and curve decomposition, but may be prone to double counting of risk associated with the portfolio.

Scenario based models may be considered to be comprehensive models due to explicit correlation modeling performed as part of the scenario based model. As such, scenario based models may be more easily extended to new risk factors. Due to availability of historical data, the scenario based models (e.g., a historical model, a Monte Carlo model, etc.) may need to be implemented parsimoniously. Further, scenario based models may be more complex than other model types and, as such, may be more difficult to calibrate. However, scenario-based models may offer greater stability of modeling parameters through the use of correlations and distributions.

Self-referencing risk may result from a clearing member firm having a net short protection position in a single CDS or a group of CDSs of itself and/or its affiliates. If the clearing member firm defaults, the clearing member firm may not be a position to make a required payment. Self-referencing risks can be created when a clearing member firm has a position in a basket of CDSs that includes a CDS that references the clearing member firm or one or more affiliates of the entity. Baskets may be used to synthetically create a desired position with a side effect of creating self-referencing risk. In accordance with embodiments of the invention, clearinghouses may determine and require clearing member firms to pay a self-referencing risk guarantee fund to account for self-referencing risks. The self-referencing risk guarantee fund may be in addition to the base guarantee fund described above.

FIG. 2 shows a chart 200 that may be used to calculate a base guarantee fund and a self-referencing risk guarantee fund in accordance with an embodiment of the invention. Chart 200 may be implemented with a computer processor that is programmed to perform the calculation described below. The computer processor may be part of an exchange computer system and/or a clearinghouse computer system. Row 202 lists four clearing firm members ($CMF_1$, $CMF_2$, $CMF_3$ and $CMF_4$). Four clearing firm members are shown for illustration purposes only. Some embodiments may include fewer or more clearing firm members. Row 204 lists a margin amount for each of the clearing member firms. The margin requirement may be calculated with one or more existing margin requirement calculation methods and the amount calculated for each clearing member firm may be a function of each of the portfolios of the clearing member firms. For example, $CMF_2$ is shown to have a high margin requirement than $CMF_1$. In some embodiments a collateral amount is determined and the collateral amount may include a margin requirement.

Row 206 lists stress requirements for each clearing member firm that are calculated to cover losses during a stress or shock condition, such as a crash in the market. The stress requirements in row 206 assume that none of the portfolios of the clearing member firms include self-referencing risks. Row 208 includes the portfolio residual lost (PRL) used to calculate the base guarantee fund in accordance with an embodiment of the invention. The $PRL^{base}$ is calculated for each clearing member firm by subtracting the margin requirement in row 204 from the stress requirement in row 206. Row 210 lists weights for the base guarantee fund $W^{base}$. Each weight may be calculated by dividing a $PRL^{base}$ by a sum of all of the $PRL^{base}$ values in row 208. The $W^{base}$ for $CMF_1$, for example, is calculated as $1200/($1200+$600+$100+$100). In alternative embodiments, weights for the base guarantee fund may be calculated according to $PRL^{base}$ values that are averaged over a predetermined time period, such as a month.

Chart 200 also includes rows for calculating a self-referencing risk guarantee fund. Row 212 includes a stress requirement $Stress^{SSR}$ for each clearing member firm that are calculated to cover losses during a stress or shock condition that involves self-referencing risks. Row 214 includes the portfolio residual lost with self-referencing risk $PRL^{SSR}$ for each of the clearing member firms. The $PRL^{SSR}$ is calculated for each clearing member firm by subtracting the margin requirement in row 204 from the stress requirement in row 212.

Next, for each clearing member firm a difference between the portfolio residual lost $\Delta PRL^{SSR}$ is calculated in row 216. The $\Delta PRL^{SRR}$ values in row 216 are calculated by determining differences between $PRL^{base}$ and $PRL^{SRR}$.

Row 218 lists weights for the self-referencing risk guarantee fund $W^{SRR}$. Each weight may be calculated by dividing a sum of all of the $\Delta PRL^{SRR}$ values in row 216 by an individual $\Delta PRL^{SRR}$ value in row 216. The $W^{SSR}$ for $CMF_1$, for example, is calculated as $900/($900+$450+$900+$0).

For each clearing firm member a self-referencing risk guarantee fund SRRGFi and a base guarantee funds $BGF_i$ are calculated in rows 220 and 222, respectively. The calculations for the $SRRGF_i$ values begin by first selecting a predetermined number of the highest values from row 216. In the example shown, two values are selected because it is unlikely that more than two clearing member firms would default. The top two values in row 216 are $900 and $900 and total to $1,800. Each $SRRGF_i$ value is determined by multiplying a corresponding $W^{SRR}$ by the $1,800 total.

The calculations for the $BGF_i$ values begin by first selecting a predetermined number of the highest values from row 208. In the example show, two values are selected because it is unlikely that more than two clearing member firms would default. The top two values in row 208 are $1,200 and $600 and total to $1,800. Each $BGF_i$ value is determined by multiplying a corresponding $W^{base}$ by the $1,800 total. Finally, total guarantee fund $GF_i$ values are calculated in row 224 by summing values in rows 220 and 222.

Figure 3:
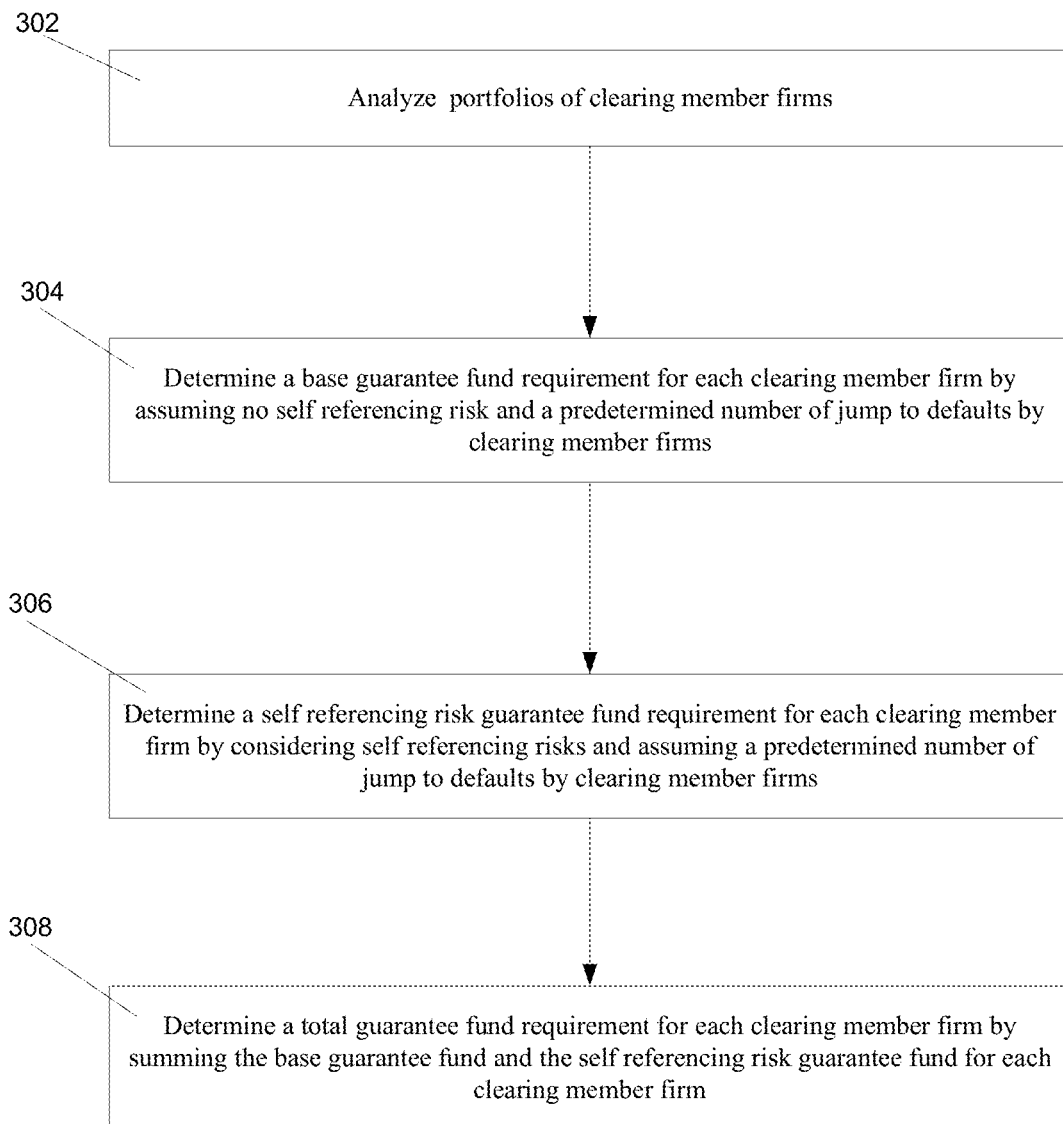
FIG. 3 illustrates a computer implemented process that may be used to determine total guarantee fund values for a number of clearing member firms, in accordance with an embodiment of the invention.

FIG. 3 illustrates a computer implemented process that may be used to determine total guarantee fund values for a number of clearing member firms, in accordance with an embodiment of the invention. First, in step 302 portfolios of the clearing member firms are analyzed. Step 302 may be performed to identified particular risks, such as self-referencing risks, evaluate portfolios and determine margin requirements. Next, in step 304 a base guarantee fund requirement is determined for each clearing member firm by assuming no self-referencing risk and a predetermined number of clearing member firm jump to defaults. The predetermined number of defaults may be determined by a clearinghouse, regulatory entity or some other entity. An exemplary embodiment for determining a base guarantee fund is described below in connection with FIG. 4. The predetermined number of jump to defaults may be two, three or any number that represents a number of defaults that is not likely to be exceeded. A self-referencing risk guarantee fund requirement for each clearing member firm is determined in step 306 by considering self-referencing risks and assuming a predetermined number of jump to defaults by clearing member firms. An exemplary embodiment for determining a self-referencing risk guarantee fund is described below in connection with FIG. 5. Finally, in step 308 a total guarantee fund requirement for each clearing member firm is determined by summing the base guarantee fund and the self-referencing risk guarantee fund for each clearing member firm.

Figure 4:
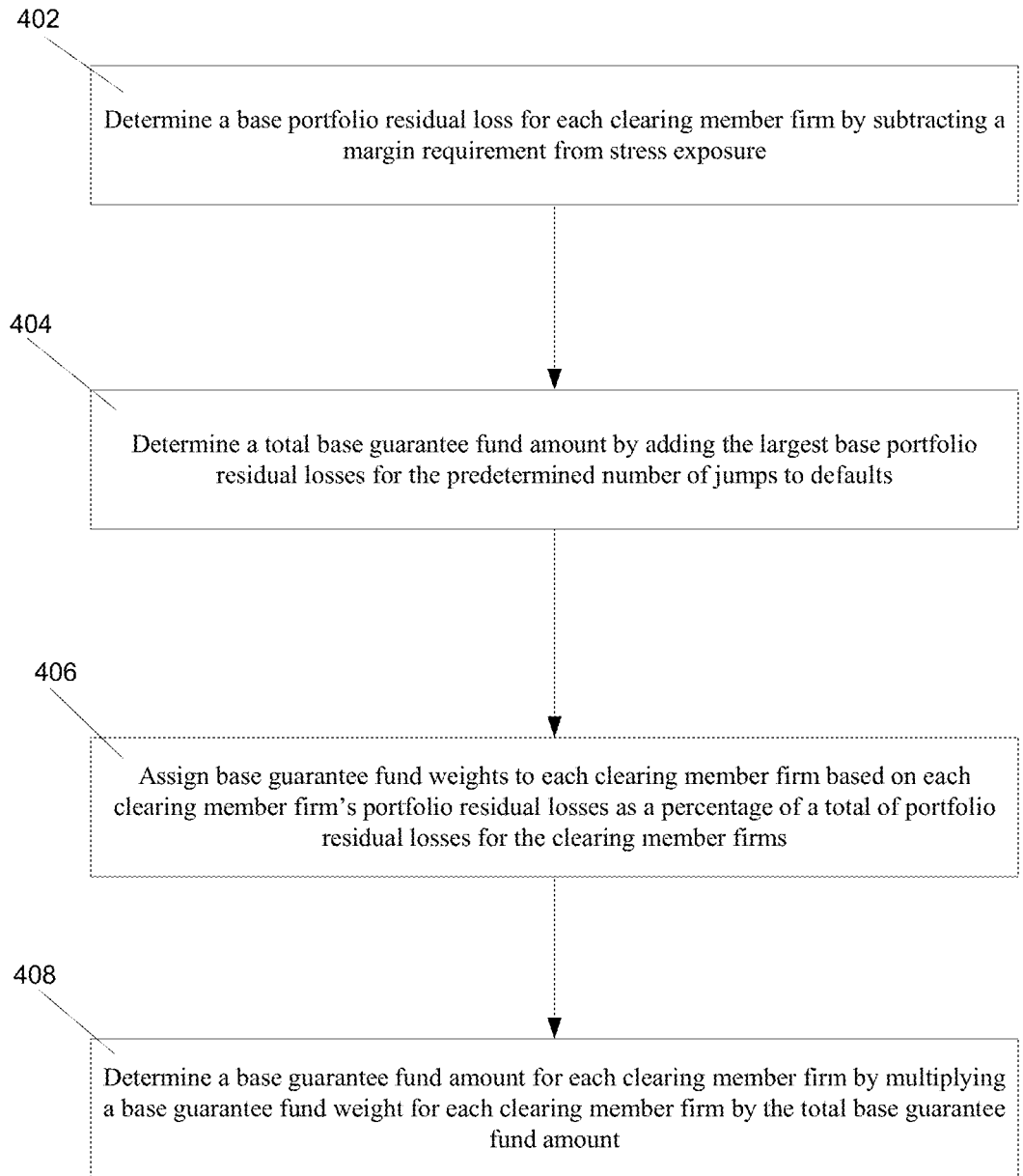
FIG. 4 illustrates a computer implemented process that may be used to determine base guarantee fund values for a number of clearing member firms, in accordance with an embodiment of the invention.

FIG. 4 illustrates a computer implemented process that may be used to determine base guarantee fund values for a number of clearing member firms, in accordance with an embodiment of the invention. The process shown in FIG. 4 assumes that none of the clearing member firms have positions that create self-referencing risks. First, in step 402 a base portfolio residual loss $PRL^{base}$ is determined for each clearing member firm. The base portfolio residual loss $PRL^{base}$ may be determined by subtracting a margin requirement from stress exposure. Margin requirements may be determined with one or more of the existing margin requirement methods and may be scenario based. Stress exposure may correspond to stress on a portfolio during a market crash or other event. Next, a total base guarantee fund amount is determined in step 404 by adding the largest base portfolio residual losses for the predetermined number of jumps to defaults. The predetermined number of jump to defaults may be two, three or any number that represents a number of defaults that is not likely to be exceeded. In step 406, base guarantee fund weights are assigned to each clearing member firm. The base guarantee fund weights may be based on each clearing member firm's portfolio residual losses as a percentage of a total of portfolio residual losses for the clearing member firms. Finally in step 408 a base guarantee fund amount may be determined for each clearing member firm by multiplying a base guarantee fund weight for each clearing member firm by the total base guarantee fund amount. Alternative embodiments for calculating base guarantee fund values may utilize one or more of the values or methods described above.

Figure 5:
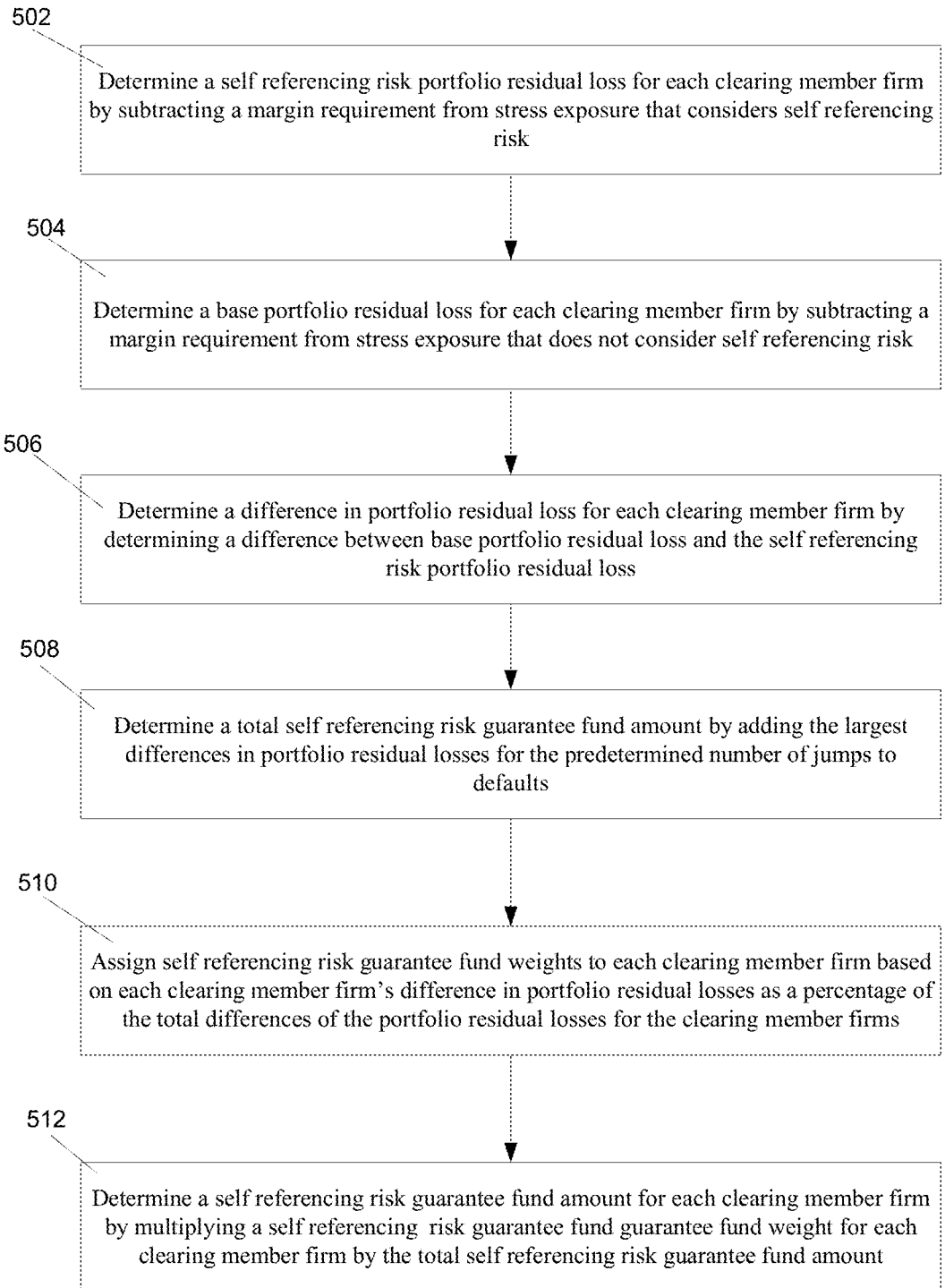
FIG. 5 illustrates a computer implemented process that may be used to determine self-referencing risk guarantee fund values for a number of clearing member firms, in accordance with an embodiment of the invention.
Figure 6:
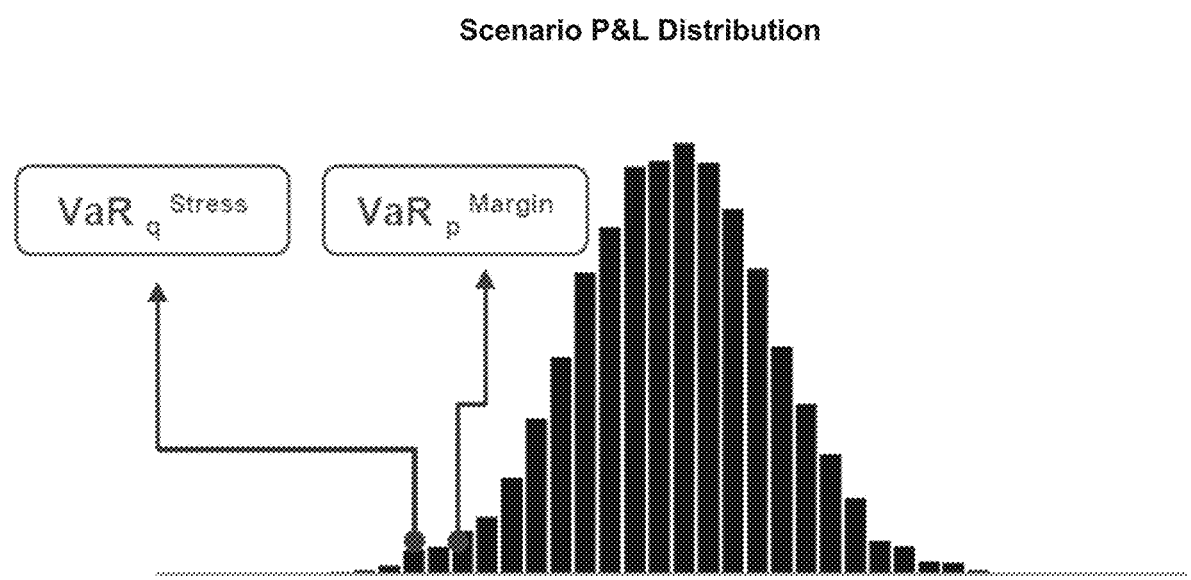
FIG. 6 shows an illustrative profit and loss distribution of a risk model according to at least some embodiments.

FIG. 5 illustrates a computer implemented process that may be used to determine self-referencing risk guarantee fund values for a number of clearing member firms, in accordance with an embodiment of the invention. The process shown in FIG. 5 assumes that at least some of the clearing member firms have positions that create self-referencing risks. First, in step 502 a self-referencing risk portfolio residual loss PRO' for each clearing member firm is determined. The self-referencing risk portfolio residual loss may be determined by subtracting a margin requirement from stress exposure that considers self-referencing risk. In step 504 a base portfolio residual loss for each clearing member firm is determined. As mentioned above, the base portfolio residual loss for each clearing member firm may be determined by subtracting a margin requirement from stress exposure that does not consider self-referencing risk. Next, a difference in portfolio residual loss for each clearing member firm may be determined in step 506. The difference in portfolio residual loss for each clearing member firm may be calculated by determining a difference between base portfolio residual loss and the self-referencing risk portfolio residual loss for each clearing member firm. In step 508 a total self-referencing risk guarantee fund amount is determined. The amount may be determined by adding the largest differences in portfolio residual losses for the predetermined number of jumps to defaults. As mentioned above, the predetermined number of jump to defaults may be two, three or any number that represents a number of defaults that is not likely to be exceeded. In some embodiments the predetermined number of jump to defaults used with the process shown in FIG. 4 is not the same as the predetermined number of jump to defaults used with the process shown in FIG. 5.

In step 510 self-referencing risk guarantee fund weights are assigned to each clearing member firm. The self-referencing risk guarantee fund weights may be based on each clearing member firm's difference in portfolio residual losses as a percentage of the total differences of the portfolio residual losses for the clearing member firms. Finally, a self-referencing risk guarantee fund amount is determined for each clearing member firm in step 512. Step 512 may include multiplying a self-referencing risk guarantee fund guarantee fund weight for each clearing member firm by the total self-referencing risk guarantee fund amount.

The processes shown in FIGS. 4 and 5 allow computer devices to rapidly and efficiently determine guarantee fund amounts. The speed at which a computer device can perform these processes becomes particularly important when a large number of clearing member firms are involved. In some embodiments, at least some parts of the processes are performed with separate processors and/or separate processing cores. The use of separate processors and/or processing cores allows for parallel processing and increased performance. One or more processors or processing cores performing the processes shown in FIGS. 4 and 5 may also be programmed to incrementally update calculates as data changes to increase speed and efficiency.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention.

The invention claimed is:

1. A computer implemented method including:
generating a self-referencing risk (SRR) table in a memory storage by:
determining, by a processor coupled with the memory storage, a first vector element of the SRR table including a first entry for each of multiple member entities, the first entry including a base guarantee fund value for the respective member entity by assuming no self-referencing risk and a predetermined number of jump to defaults by the multiple member entities;
assigning each of multiple member entities a base guarantee fund weight, the base guarantee fund weight for each of the multiple member entities including a weight determined by dividing an individual value for the respective member entity by a total combined value for the multiple member entities;
executing, by the processor, a first memory operation to populate the first vector element of the SRR in the memory storage;
determining, by the processor, a second vector element of the SRR table, the second vector element including a second entry for each of the multiple member entities, the second entry including a self-referencing risk guarantee fund value for the respective member entity by considering self-referencing risk and the predetermined number of jump to defaults by the multiple member entities and further combining values from a margin model and values from a stress model for the multiple member entities, the margin model and stress model being executed out over at least a risk horizon;
executing, by the processor, a second memory operation to populate the second vector element of the SRR table in the memory storage;
summing, by the processor, the first and second vector elements, to generate a third vector element of the SRR table, the third vector element including a third entry for each of the multiple member entities, the third entry including a total guarantee fund value for the respective member entry; and
executing, by the processor, a third memory operation to populate the third vector element of the SRR table in the memory storage;
receiving by the processor, a value update for one or more of the multiple member entities;
determining, by the processor, entries affected by the value update;
recalculating, by the processor, only the entries affected by the value update; and
executing, by the processor, an incremental memory operation to populate only the entries affected by the value update as an incremental data update.

2. The computer implemented method of claim 1, where the predetermined number of jump to defaults is two.

3. The computer implemented method of claim 1, where a contribution due to assumption of the predetermined number of jump to defaults is determined based on selection of the predetermined number of top valued ones of the multiple member entities.

4. The computer implemented method of claim 1, where:
recalculating, by the processor, includes one or more parallelized vector operations.

5. The computer implemented method of claim 1, where the margin model covers a risk horizon of five or more days.

6. The computer implemented method of claim 1, where the margin model and/or the stress model include a time series analysis of one or more risk factors.

7. The computer implemented method of claim 1, where the margin model and/or the stress model include scenario model that is extensible to newly determined risk factors.

8. A system including:
memory; and
processing circuitry in data communication with the memory, the processing circuitry configured to:
generate a self-referencing risk (SRR) table in the memory by:
determining a first vector element of the SRR table including a first entry for each of multiple member entities, the first entry including a base guarantee fund value for the respective member entity by assuming no self-referencing risk and a predetermined number of jump to defaults by the multiple member entities;
executing a first memory operation to populate the first vector element of the SRR in the memory;
assigning each of the multiple member entities a base guarantee fund weight, the base guarantee fund weight for each of the multiple member entities including a weight determined by dividing an individual value for the respective member entity by a total combined value for the multiple member entities;

determining a second vector element of the SRR table, the second vector element including a second entry for each of the multiple member entities, the second entry including a self-referencing risk guarantee fund value for the respective member entity by considering self-referencing risk and the predetermined number of jump to defaults by the multiple member entities and further combining values from a margin model and values from a stress model for the multiple member entities, the margin model and stress model being executed out over at least a risk horizon;

executing a second memory operation to populate the second vector element of the SRR table in the memory;

summing the first and second vector elements, to generate a third vector element of the SRR table, the third vector element including a third entry for each of the multiple member entities, the third entry including a total guarantee fund value for the respective member entry; and executing a third memory operation to populate the third vector element of the SRR table in the memory;

receive a value update for one or more of the multiple member entities;

determine entries affected by the value update;

recalculate only the entries affected by the value update; and execute an incremental memory operation to populate only the entries affected by the value update as an incremental data update.

9. The system of claim 8, where the margin model covers a risk horizon of five or more days.

10. The system of claim 8, where the margin model and/or the stress model include a time series analysis of one or more risk factors.

11. The system of claim 8, where the margin model and/or the stress model include scenario model that is extensible to newly determined risk factors.

12. The system of claim 8, where the predetermined number of jump to defaults is two.

13. The system of claim 8, where a contribution due to assumption of the predetermined number of jump to defaults is determined based on selection of the predetermined number of top valued ones of the multiple member entities.

14. A system including:
means for generating a self-referencing risk (SRR) table in a memory storage by:
determining a first vector element of the SRR table including a first entry for each of multiple member entities, the first entry including a base guarantee fund value for the respective member entity by assuming no self-referencing risk and a predetermined number of jump to defaults by the multiple member entities;
assigning each of the multiple member entities a base guarantee fund weight, the base guarantee fund weight for each of the multiple member entities including a weight determined by dividing an individual value for the respective member entity by a total combined value for the multiple member entities;
executing a first memory operation to populate the first vector element of the SRR in the memory storage;
determining a second vector element of the SRR table, the second vector element including a second entry for each of the multiple member entities, the second entry including a self-referencing risk guarantee fund value for the respective member entity by considering self-referencing risk and the predetermined number of jump to defaults by the multiple member entities and further combining values from a margin model and values from a stress model for the multiple member entities, the margin model and stress model being executed out over at least a risk horizon;
executing a second memory operation to populate the second vector element of the SRR table in the memory storage;
summing the first and second vector elements, to generate a third vector element of the SRR table, the third vector element including a third entry for each of the multiple member entities, the third entry including a total guarantee fund value for the respective member entry; and
executing a third memory operation to populate the third vector element of the SRR table in the memory storage;
means for receiving a value update for one or more of the multiple member entities;
means for determining entries affected by the value update;
means for recalculating only the entries affected by the value update; and
means for executing an incremental memory operation to populate only the entries affected by the value update as an incremental data update.

15. The system of claim 14, where the predetermined number of jump to defaults is two.

16. The system of claim 14, where a contribution due to assumption of the predetermined number of jump to defaults is determined based on selection of the predetermined number of top valued ones of the multiple member entities.

17. The system of claim 14, where:
the means for recalculating includes means for performing one or more parallelized vector operations.

18. The system of claim 14, where the margin model covers a risk horizon of five or more days.

19. The system of claim 14, where the margin model and/or the stress model include a time series analysis of one or more risk factors.

20. The system of claim 14, where the margin model and/or the stress model include scenario model that is extensible to newly determined risk factors.

* * * * *